US012613816B2

(12) United States Patent
Park et al.

(10) Patent No.: US 12,613,816 B2
(45) Date of Patent: Apr. 28, 2026

(54) SYSTEM AND METHOD FOR MEMORY SIGNAL TIMING CALIBRATION WITH PHASE CONTROL CIRCUIT

(71) Applicant: Samsung Electronics Co., Ltd., Suwon-si (KR)

(72) Inventors: Joung Won Park, San Diego, CA (US); Jaehyup Kim, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 18/515,094

(22) Filed: Nov. 20, 2023

(65) Prior Publication Data

US 2025/0077448 A1     Mar. 6, 2025

Related U.S. Application Data

(60) Provisional application No. 63/535,542, filed on Aug. 30, 2023.

(51) Int. Cl.
G06F 13/16 (2006.01)
(52) U.S. Cl.
CPC .................................. G06F 13/1689 (2013.01)
(58) Field of Classification Search
CPC .......................... G06F 13/1668; G06F 13/1694
See application file for complete search history.

(56) References Cited

U.S. PATENT DOCUMENTS

| | | | |
|---|---|---|---|
| 7,791,375 B1 | 9/2010 | Clarke | |
| 8,520,793 B2 * | 8/2013 | Lin ......................... | H04L 7/033 |
| | | | 375/376 |
| 9,158,873 B1 | 10/2015 | Chong et al. | |
| 9,419,783 B1 * | 8/2016 | Wang .................... | H03L 7/0807 |
| 11,302,380 B2 | 4/2022 | Zheng | |
| 2003/0112909 A1 * | 6/2003 | Best ...................... | H04L 7/0337 |
| | | | 375/355 |
| 2010/0271092 A1 * | 10/2010 | Zerbe .................. | G11C 11/4076 |
| | | | 327/161 |
| 2018/0067538 A1 | 3/2018 | Ware et al. | |
| 2019/0187744 A1 | 6/2019 | Chang et al. | |
| 2020/0106598 A1 | 4/2020 | Stott et al. | |
| 2021/0343327 A1 * | 11/2021 | Zheng ................. | G11C 11/4076 |
| 2023/0421161 A1 * | 12/2023 | Choi ....................... | H03L 7/091 |

FOREIGN PATENT DOCUMENTS

| | | |
|---|---|---|
| CN | 113889172 A | 1/2022 |
| CN | 115118256 A | 9/2022 |

* cited by examiner

*Primary Examiner* — Raymond N Phan
(74) *Attorney, Agent, or Firm* — Womble Bond Dickinson (US) LLP

(57)     ABSTRACT

A system and method for memory signal timing calibration. In some embodiments, the system includes: a memory input-output circuit, including: a first circuit for generating a first data signal; a second circuit for generating a second data signal; and a first phase control circuit, the first phase control circuit being configured to perform a phase adjustment of a phase of the second data signal.

20 Claims, 10 Drawing Sheets

Figure 6:
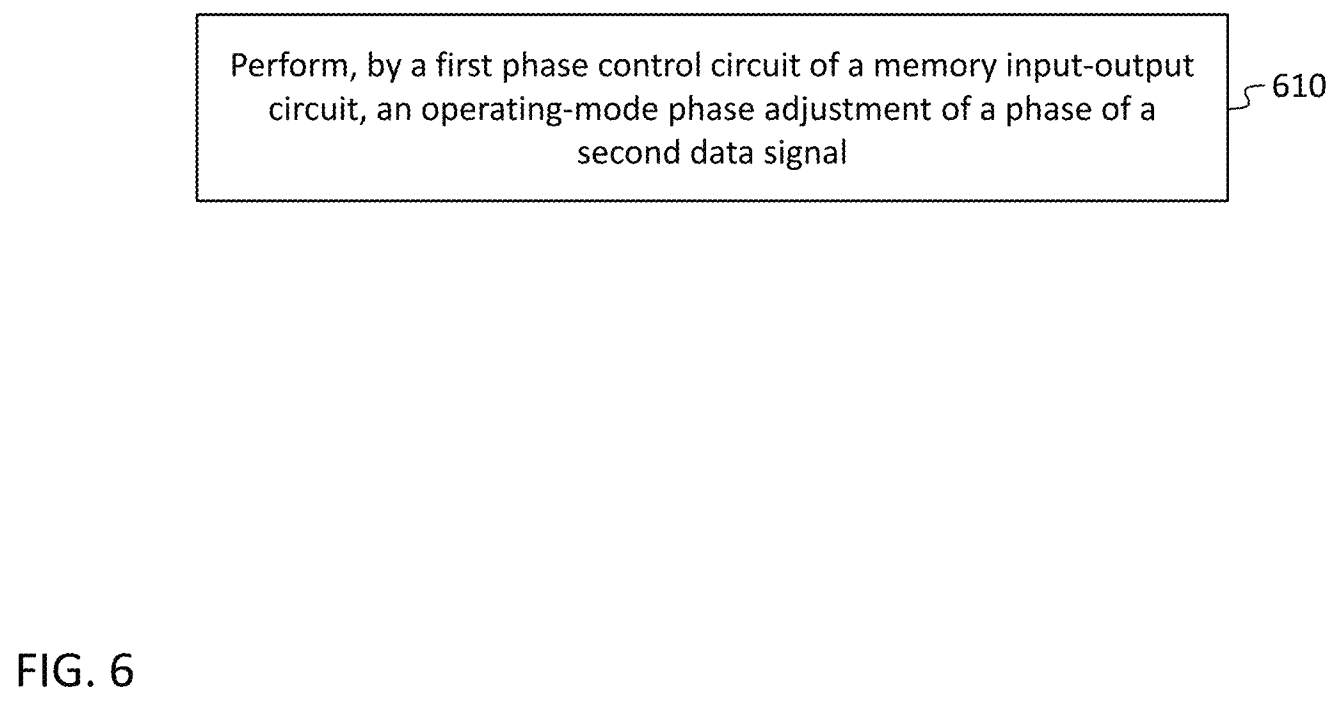

Perform, by a first phase control circuit of a memory input-output circuit, an operating-mode phase adjustment of a phase of a second data signal

SYSTEM AND METHOD FOR MEMORY SIGNAL TIMING CALIBRATION WITH PHASE CONTROL CIRCUIT

CROSS-REFERENCE TO RELATED APPLICATION(S)

The present application claims priority to and the benefit of U.S. Provisional Application No. 63/535,542, filed Aug. 30, 2023, entitled "BACKGROUND DATA STROBE TO DATA SIGNAL (DQS2DQ) CALIBRATION METHOD USING DATA SIGNAL (DQ) TIMING STATISTICS", the entire content of which is incorporated herein by reference.

FIELD

One or more aspects of embodiments according to the present disclosure relate to memory functionality, and more particularly to a system and method for memory signal timing calibration.

BACKGROUND

In computing systems including memory, a memory may require various supporting circuits for interfacing to the memory. Such circuits may include address decoding circuits, drive circuits for driving a data bus connected to a processor or to a memory management unit, and the like. Such supporting circuits may perform various functions and ensure optimal performance of the memory. A memory input-output circuit may be employed to generate drive signals for the memory.

It is with respect to this general technical environment that aspects of the present disclosure are related.

SUMMARY

According to an embodiment of the present disclosure, there is provided a system, including: a memory input-output circuit, including: a first circuit for generating a first data signal; a second circuit for generating a second data signal; and a first phase control circuit, the first phase control circuit being configured to perform a phase adjustment of a phase of the second data signal.

In some embodiments, the first phase control circuit includes a phase interpolator configured to generate a first interpolated signal having a phase between the second data signal and a third data signal.

In some embodiments: the first phase control circuit includes a phase interpolator configured to generate a first interpolated signal having a phase between the second data signal and a third data signal; and the third data signal has a phase differing from a phase of the second data signal by substantially ninety degrees.

In some embodiments: the first phase control circuit includes a phase interpolator configured to generate a first interpolated signal; and the first phase control circuit is configured to perform an operating-mode phase adjustment of a phase of the second data signal based on: a value of the second data signal at an edge of the first data signal, a value of the first interpolated signal at the edge of the first data signal, and a value of a third data signal at the edge of the first data signal.

In some embodiments: the first phase control circuit includes a phase interpolator configured to generate a first interpolated signal having a phase substantially mid-way between the second data signal and a third data signal; and the first phase control circuit is configured to perform an operating-mode phase adjustment of a phase of the second data signal based on: a value of the second data signal at an edge of the first data signal, a value of the first interpolated signal at the edge of the first data signal, and a value of a third data signal at the edge of the first data signal.

In some embodiments: the first phase control circuit includes a phase interpolator configured to generate a first interpolated signal having a phase substantially mid-way between the second data signal and a third data signal.

In some embodiments: the first phase control circuit includes a phase interpolator configured to generate a first interpolated signal; and the first phase control circuit is configured: to determine that a value of the second data signal at an edge of the first data signal equals a first value; to determine that a value of the first interpolated signal at an edge of the first data signal equals a second value; to determine that a value of a third data signal at an edge of the first data signal equals a third value; to determine that the second value is the same as the first value; to determine that the third value is different from the second value; and to advance a second counter.

In some embodiments, the system further includes a memory cell, on a same semiconductor chip as the memory input-output circuit.

According to an embodiment of the present disclosure, there is provided a device, including: a semiconductor chip, including: a memory cell, and a memory input-output circuit. the memory input-output circuit including: a first circuit for generating a first data signal; a second circuit for generating a second data signal; and a first phase control circuit, the first phase control circuit being configured to perform an operating-mode phase adjustment of a phase of the second data signal.

In some embodiments, the first phase control circuit includes a phase interpolator configured to generate a first interpolated signal having a phase between the second data signal and a third data signal.

In some embodiments: the first phase control circuit includes a phase interpolator configured to generate a first interpolated signal having a phase between the second data signal and a third data signal; and the third data signal has a phase differing from a phase of the second data signal by substantially ninety degrees.

In some embodiments: the first phase control circuit includes a phase interpolator configured to generate a first interpolated signal having a phase between the second data signal and a third data signal; and the first phase control circuit is configured to perform an operating-mode phase adjustment of a phase of the second data signal based on: a value of the second data signal at an edge of the first data signal, a value of the first interpolated signal at the edge of the first data signal, and a value of the third data signal at the edge of the first data signal.

In some embodiments: the first phase control circuit includes a phase interpolator configured to generate a first interpolated signal having a phase substantially mid-way between the second data signal and a third data signal; and the first phase control circuit is configured to perform an operating-mode phase adjustment of a phase of the second data signal based on: a value of the second data signal at an edge of the first data signal, a value of the first interpolated signal at the edge of the first data signal, and a value of the third data signal at the edge of the first data signal.

In some embodiments: the first phase control circuit includes a phase interpolator configured to generate a first interpolated signal having a phase substantially mid-way between the second data signal and a third data signal.

In some embodiments: the first phase control circuit includes a phase interpolator configured to generate a first interpolated signal; and the first phase control circuit is configured: to determine that a value of the second data signal at an edge of the first data signal equals a first value; to determine that a value of the first interpolated signal at an edge of the first data signal equals a second value; to determine that a value of a third data signal at an edge of the first data signal equals a third value; to determine that the second value is the same as the first value; to determine that the third value is different from the second value; and to advance a second counter.

According to an embodiment of the present disclosure, there is provided a method, including: performing, by a first phase control circuit of a memory input-output circuit, an operating-mode phase adjustment of a phase of a second data signal, wherein the memory input-output circuit includes: a first circuit for generating a first data signal; a second circuit for generating the second data signal; and the first phase control circuit.

In some embodiments: the first phase control circuit includes a phase interpolator; and the method includes generating, by the phase interpolator, a first interpolated signal having a phase between the second data signal and a third data signal.

In some embodiments: the first phase control circuit includes a phase interpolator; and the method includes generating, by the phase interpolator, a first interpolated signal having a phase between the second data signal and a third data signal; and the third data signal has a phase differing from a phase of the second data signal by substantially ninety degrees.

In some embodiments, the first phase control circuit includes a phase interpolator configured to generate a first interpolated signal having a phase substantially mid-way between the second data signal and a third data signal.

In some embodiments, a semiconductor chip includes the memory input-output circuit and a memory cell.

BRIEF DESCRIPTION OF THE DRAWINGS

These and other features and advantages of the present disclosure will be appreciated and understood with reference to the specification, claims, and appended drawings wherein:

FIG. 6 is a flow chart, according to an embodiment of the present disclosure.

DETAILED DESCRIPTION

Figure 1:
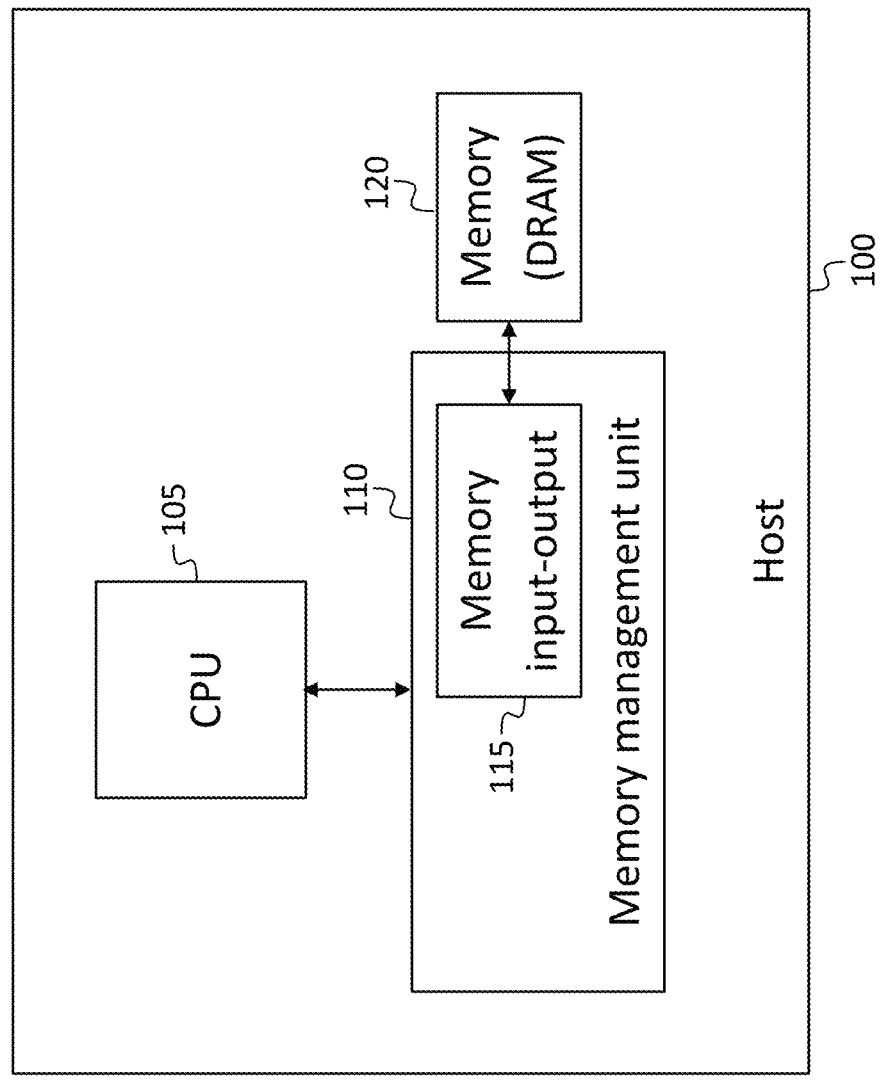
FIG. 1 is a system level block diagram, according to an embodiment of the present disclosure.

The detailed description set forth below in connection with the appended drawings is intended as a description of exemplary embodiments of a system and method for memory signal timing calibration provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In a computing system, a memory input-output circuit may generate drive signals for memory, for example, for dynamic random-access memory. Such drive signals may include a data signal (for example, carrying data to be written) and a data strobe signal (an edge of which may be used to latch the data into the memory (for example, into a memory cell of the memory). The data signal and the data strobe signal may experience (for example, propagate on) different signal paths.

As such, if the temperature of the memory input-output circuit varies or if the power-supply voltage (VDD) of the memory input-output circuit varies, the delay change (caused by the temperature change or by the change in the power-supply voltage) in the data signal may be different from the delay change (caused by the temperature change or by the change in the power-supply voltage) in the data strobe signal. If the differential delay change is sufficiently large and not compensated for, it may cause write errors in write operations performed on the memory, as a result, for example, of setup time violations or hold time violations.

As such, a host containing a central processing unit (CPU), a memory, and a memory input-output circuit may periodically (for example, at startup, and periodically thereafter, or when a temperature change or power-supply voltage change is detected by the host) perform a calibration. This calibration may be performed, for example, in a calibration mode, by performing a series of memory write operations while adjusting the delay of the data strobe signal relative to the data signal over some range of delays, and setting the operating-mode delay to a value halfway between the shortest delay at which a successful write operation was performed and the longest delay at which a successful write operation was performed.

Such an approach may, however, have the disadvantage that (i) while the memory input-output circuit is in calibration mode, memory accesses in response to store instructions performed by the central processing unit of the host may not be performed, (ii) frequent calibrations may therefore degrade the performance of the host, or (iii) infrequent calibrations may carry a risk of write errors if the rate of temperature change or the rate of change of the power-supply voltage is sufficiently great.

As such, it may be advantageous to perform the calibration (for example, the phase adjustment of the data strobe signal) in operating mode. As used herein, "operating mode" is a mode in which memory write operations, for the purpose of writing data (and not merely for the purpose of performing a calibration) are performed. Such a phase adjustment of the data strobe signal may be performed, by a circuit that may be referred to as a data strobe phase control circuit, as follows.

In a system with a quarter-rate clock, four data strobe signals may be employed, differing from each other by 90 degrees, including a first data strobe signal and a second data strobe signal, the second data strobe signal lagging the first data strobe signal by 90 degrees. For a write operation to have a low risk of resulting in a write error, the edge in the data signal may be centered between an edge of the first data strobe signal and an edge of the second data strobe signal.

An interpolated signal may be generated from the first data strobe signal and the second data strobe signal (for example, using a phase interpolator), with, for example, the interpolated signal having an edge between (for example, mid-way between) the first data strobe signal and the second data strobe signal, so that the phase of the interpolated signal lags the phase of the first data strobe signal by 45 degrees.

If the phases of the first data strobe signal and the second data strobe signal are such that a write operation will have a low risk of resulting in a write error, then the edge of the interpolated signal may coincide with an edge of the data signal. As such, if the edge of the interpolated signal leads (for example, precedes) a corresponding edge of the data signal (indicating that the edge of the interpolated signal occurs too early, and that therefore the phase of the first data strobe signal and the phase of the second data strobe signal are too far advanced) then the data strobe phase control circuit may retard the first data strobe signal and the second data strobe signal; if the edge of the interpolated signal lags (for example, follows) a corresponding edge of the data signal then the data strobe phase control circuit may, in response, advance phase of the first data strobe signal and the phase of the second data strobe signal.

The determination of whether the edge of the interpolated signal leads the corresponding edge of the data signal or lags the corresponding edge of the data signal may be made based on samples of the first data strobe signal, the interpolated signal, and the second data strobe signal, with an edge of (i.e., taken at the time of an edge of) the data signal. If (i) the sample of the first data strobe signal with the edge of the data signal has a first value (ii) the sample of the first interpolated signal with the edge of the data signal has a second value (iii) the sample of the second data strobe signal with the edge of the data signal has a third value, (iv) the second value is different from the first value, and (v) the third value is the same as the second value, then the data strobe phase control circuit may conclude that that the interpolated signal lags (for example, follows) the corresponding edge of the data signal, and the data strobe phase control circuit may, in response, advance the phase of the first data strobe signal and the phase of the second data strobe signal.

If (i) the sample of the first data strobe signal with the edge of the data signal has a first value (ii) the sample of the first interpolated signal with the edge of the data signal has a second value (iii) the sample of the second data strobe signal with the edge of the data signal has a third value, (iv) the second value is the same as the first value, and (v) the third value is different from the second value, then the data strobe phase control circuit may conclude that that the interpolated signal leads (for example, precedes) the corresponding edge of the data signal, and the data strobe phase control circuit may, in response, retard the phase of the first data strobe signal and the phase of the second data strobe signal.

If (i) the sample of the first data strobe signal with the edge of the data signal has a first value (ii) the sample of the first interpolated signal with the edge of the data signal has a second value (iii) the sample of the second data strobe signal with the edge of the data signal has a third value, (iv) the second value is the same as the first value, and (v) the third value is the same as the second value, then the data strobe phase control circuit may take no action, and leave the phase of the first data strobe signal and the phase of the second data strobe signal unchanged.

FIG. 1 shows a system level block diagram of a host 100, including a central processing unit (CPU) 105, a memory management unit 110, the memory management unit 110 including a memory input-output circuit 115, and a system memory (for example, a dynamic random-access memory (DRAM) 120). In some embodiments, the dynamic random-access memory 120 is far away from the CPU. In some embodiments, for some applications, for example, some mobile applications, the dynamic random-access memory 120 is close to the CPU.

Figure 2A:
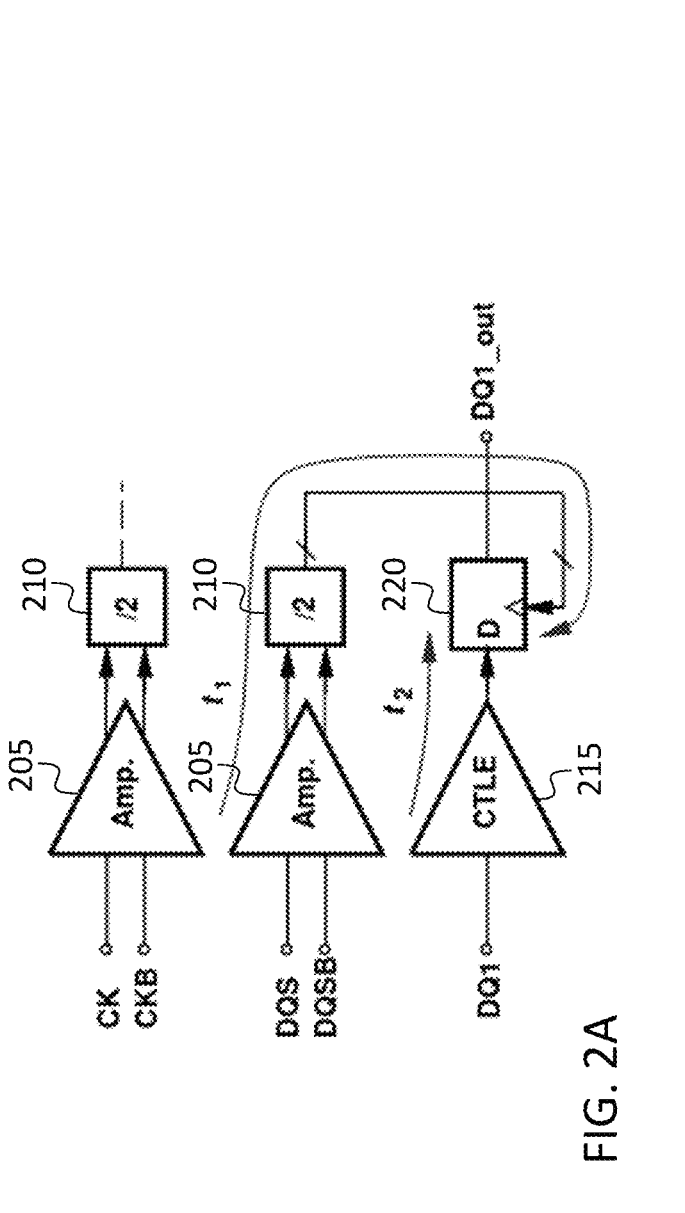
FIG. 2A is a schematic diagram of a portion of a memory input-output circuit without operating-mode phase adjustment, according to an embodiment of the present disclosure.

The memory input-output circuit 115 may include, as shown in FIG. 2A, a first differential amplifier 205 followed by a first frequency divider (for example, a first toggle flip-flop (T flip-flop)) 210 to generate a half-rate clock signal and a second differential amplifier 205 followed by a second frequency divider (for example, a second toggle flip-flop (T flip-flop)) 210 to generate two half-rate data strobe signals. The two half-rate data strobe signals may clock two D flip-flops 220, which receive, and latch, a data signal after it is filtered by a continuous time linear equalizer (CTLE). The circuit generating the data strobe signals may be referred to as a "data strobe generating circuit" or as a "second circuit".

Figure 2C:
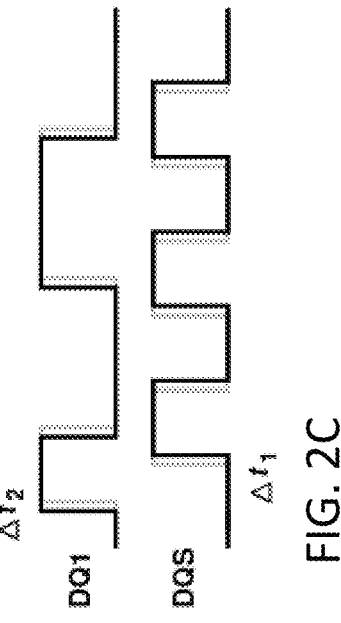
FIG. 2C is a graph of offset waveforms in a half-rate system, according to an embodiment of the present disclosure.
Figure 2B:
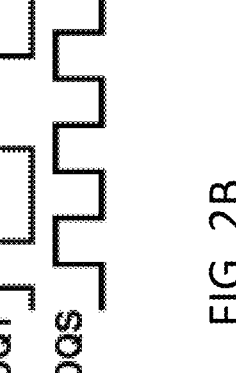
FIG. 2B is a graph of waveforms in a half-rate system, according to an embodiment of the present disclosure.

If the edges of a data strobe signal fall half-way between edges of the data signal, as illustrated in FIG. 2B, then the latching of the data signal may be reliable (for example, because setup and hold time requirements may be met). On the other hand, if, for example, as a result of uncompensated temperature changes or power-supply voltage changes, the relative phase of the data signal and the data strobe signal are such that the edges of a data strobe signal do not fall half-way between edges of the data signal, as illustrated in FIG. 2C, then errors may occur in the latching of the data signal (for example, because setup or hold time requirements may not be met).

Figure 3A:
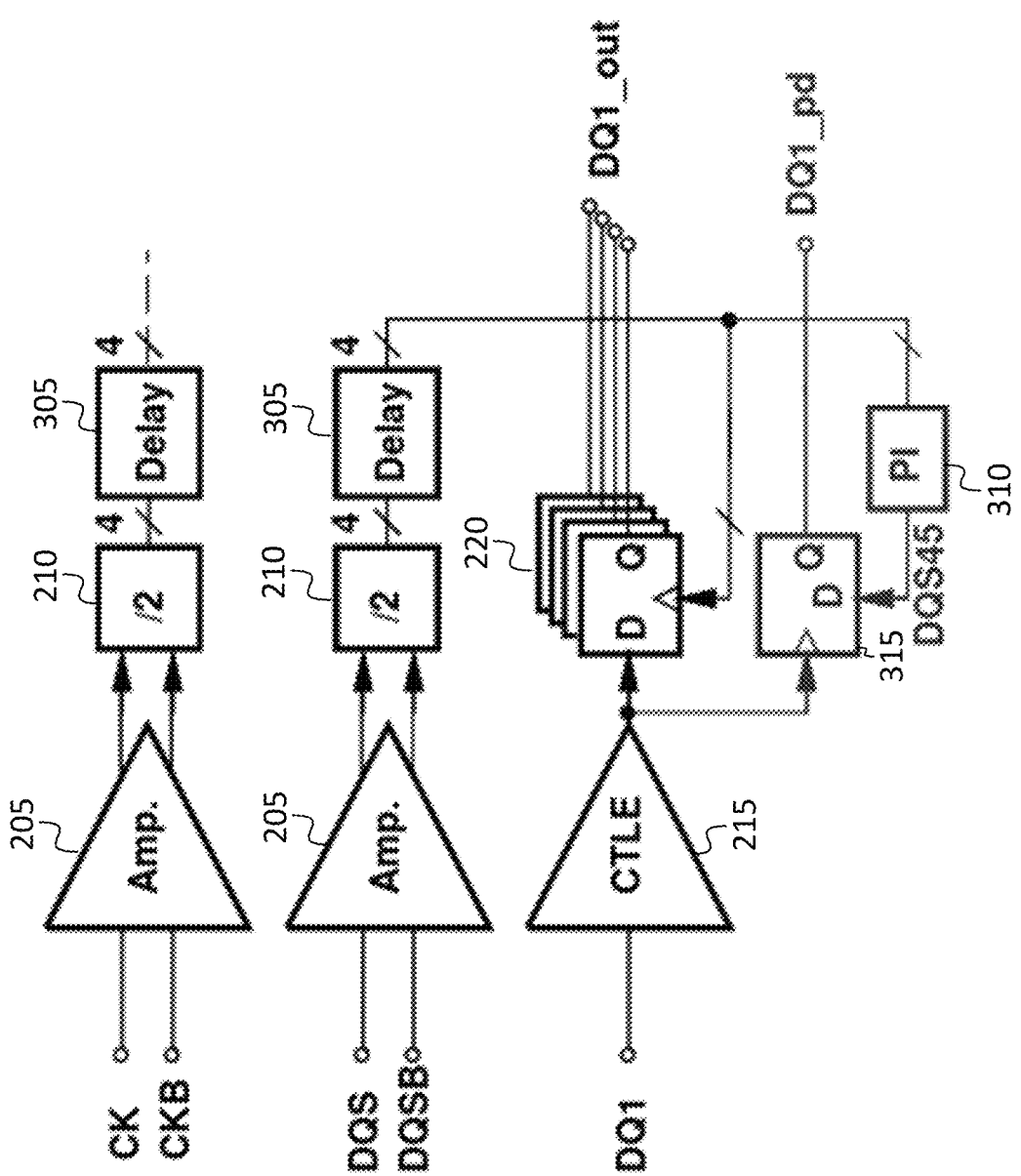
FIG. 3A is a schematic diagram of a portion of a memory input-output circuit with operating-mode phase adjustment of a first kind, according to an embodiment of the present disclosure.

Referring to FIG. 3A, in one embodiment, a first differential amplifier 205 followed by a first frequency divider 210 generate a quarter-rate clock signal and a second differential amplifier 205 followed by a second frequency divider 210 generate four quarter-rate data strobe signals. Two delay circuits 305, one following the first frequency divider 210, and one (which may be referred to as a data strobe delay circuit 305) following the second frequency divider 210, adjust the delays of the signals propagating through them. For example, the data strobe delay circuit 305 may adjust the common-mode delay of the four quarter-rate data strobe signals (for example, it may adjust the phase of each of the four quarter-rate data strobe signals by the same amount). The four quarter-rate data strobe signals may clock four D flip-flops 220, which receive, and latch, a data signal after it is filtered by a continuous time linear equalizer (CTLE) 215.

A phase interpolator (PI) 310 generates an interpolated signal from a first data strobe signal (which may have a phase defined to be zero degrees (and which may also be referred to as a "second data signal") and a second data strobe signal (which may have a phase delayed by 90 degrees with respect to (is in quadrature with) the first data strobe signal, and which may be referred to as a "third data signal"). The interpolated signal may have a phase that is substantially mid-way between (for example, that is within a first amount of mid-way between, wherein the first amount is between 0 degrees and 35 degrees) the phase of the first data strobe signal and the phase of the second data strobe signal. In some embodiments, the interpolated signal is within 10 degrees of being mid-way between the phase of the first data strobe signal and the phase of the second data strobe signal. In some embodiments, the setup time of the D flip-flops 220 is greater or less than the hold time of the D flip-flops 220, and the nominal phase of the interpolated signal is selected so that the setup time margin equals the hold time margin.

A sampling flip-flop 315 (which may be a D flip-flop) is used to sample the interpolated signal (at or near a corresponding rising edge of the interpolated signal) with the rising edge of the data signal. As used herein sampling a first signal "with" an edge of a second signal means obtaining a sample of the first signal at a sampling time defined by the edge of the second signal. As used herein, a value of a first signal at an edge of a second signal means the value the first signal has at the time the edge occurs in the second signal.

Figure 3B:
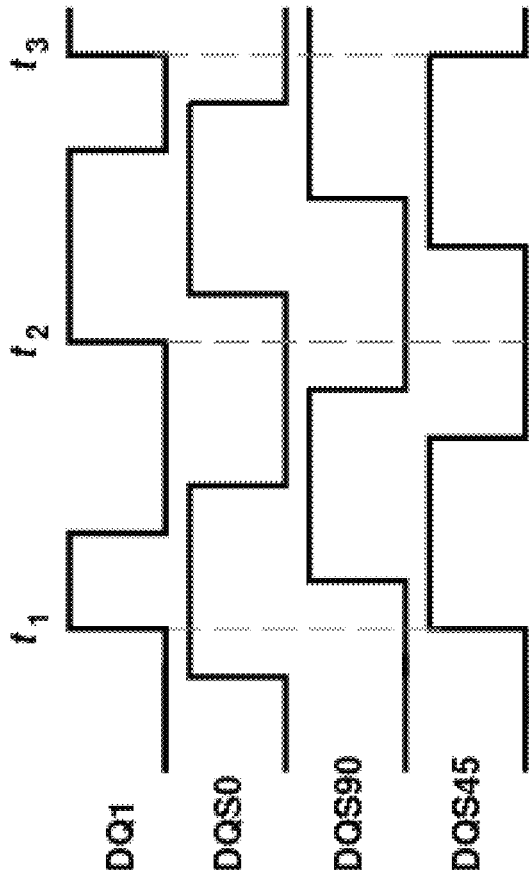
FIG. 3B is a graph of a first set of data and data strobe waveforms, according to an embodiment of the present disclosure.

The data signal (DQ1), the first data strobe signal DQS0, the second data strobe signal DQS90, and the interpolated signal DQS45 are shown in FIG. 3B, in some embodiments. At a time $t_1$, the interpolated signal is sampled with the data signal. The value of the sample obtained in this manner may indicate, (i) if the value of the sample is 1, that the edge in the interpolated signal leads the edge in the data signal (indicating that the phase of the first data strobe signal and the phase of the second data strobe signal should be retarded) or (ii) if the value of the sample is 0, that the edge in the interpolated signal lags the edge in the data signal (indicating that the phase of the first data strobe signal and the phase of the second data strobe signal should be advanced). As such, in such an embodiment, the data strobe phase control circuit (which may also be referred to simply as a "phase control circuit") may adjust (for example, advance or retard) the phase of the first data strobe signal and the second data strobe signal based on the value of the sample. As used herein, the data strobe phase control circuit includes the portions of the circuit that are used to detect the phase error of the data strobe signals relative to the data signal and to feed back (for example, to the data strobe delay circuit 305) to reduce this phase error.

In the embodiment of FIGS. 3A and 3B, however, other samples that may be obtained with the rising edge (i) may not be helpful for adjusting the phase of the first data strobe signal and the phase of the second data strobe signal (for example, a sample obtained at $t_2$) or (ii) (for example, a sample obtained at $t_3$) may produce an opposite result to that of the sample obtained at $t_1$. As such, in some embodiments, additional circuitry may be used to discard samples that do not coincide with (or nearly coincide with) a rising edge in the interpolated signal. In the embodiment of FIG. 3A, the opportunity to measure the relative phase of the data signal and of the interpolated signal at time $t_3$ may therefore be lost.

Figure 4A:
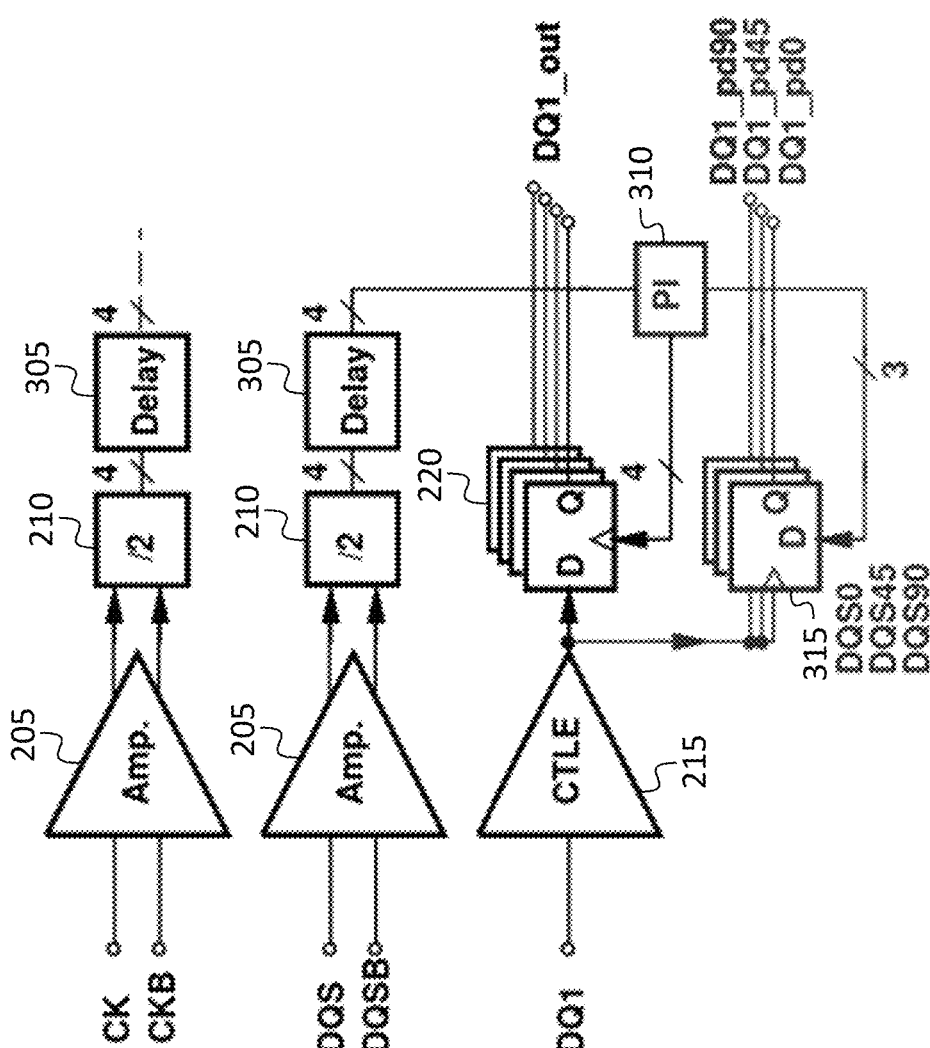
FIG. 4A is a schematic diagram of a portion of a memory input-output circuit with operating-mode phase adjustment of a second kind, according to an embodiment of the present disclosure.

FIG. 4A shows a portion of a memory input-output circuit, in some embodiments. As in the embodiment of FIG. 3A, a phase interpolator (PI) 310 generates an interpolated signal from the four data strobe signals (for example, from the first data strobe signal and the second data strobe signal) at the output of the data strobe delay circuit 305. Three sampling flip-flops 315 (which may be D flip-flops) are used to sample each of (i) the first data strobe signal, (ii) the interpolated signal, and (iii) the second data strobe signal with the rising edge of the data signal, to form: (i) a sample of the first data strobe signal with an edge of the first data signal, (ii) a sample of the interpolated signal with the edge of the first data signal, and (iii) a sample of the second data strobe signal with the edge of the first data signal. In FIG. 4A, the combination of the second differential amplifier 205, the second frequency divider 210, and the data strobe delay circuit 305 may be referred to as a "data strobe signal generating circuit", and the CTLE may be referred to as a "data signal generating circuit" or as a "first circuit".

Figure 4B:
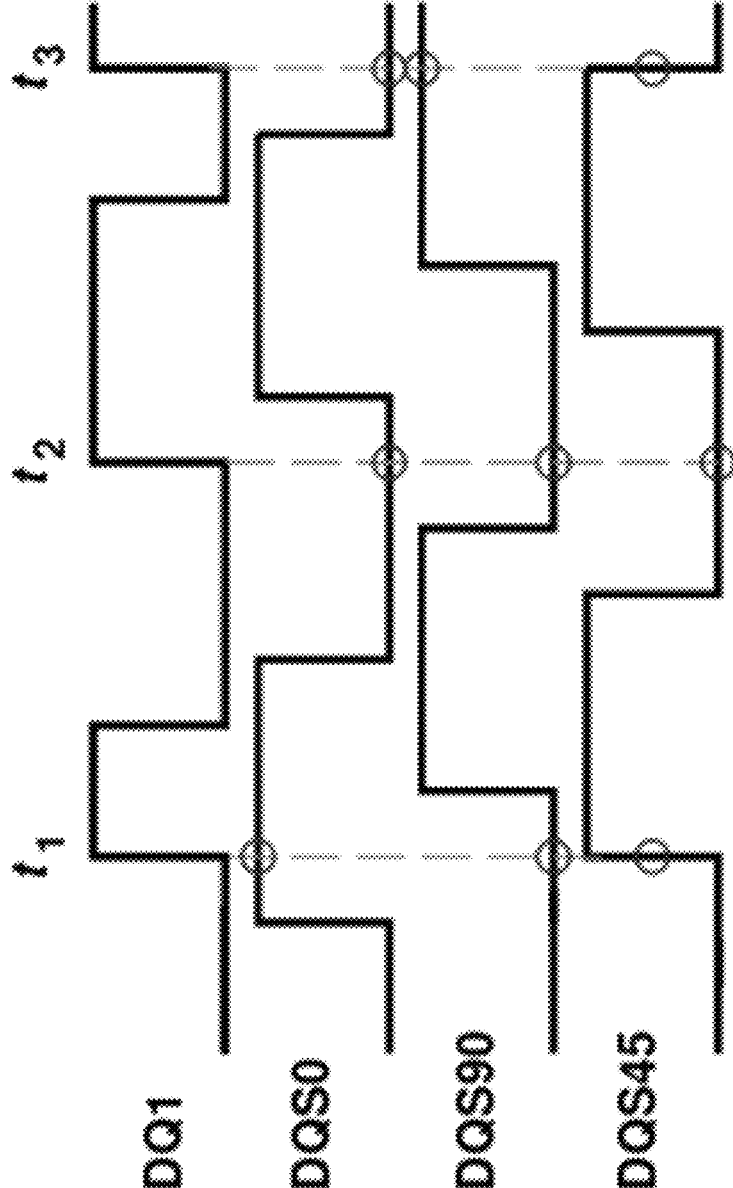
FIG. 4B is a graph of a second set of data and data strobe waveforms, according to an embodiment of the present disclosure.
Figure 4C:
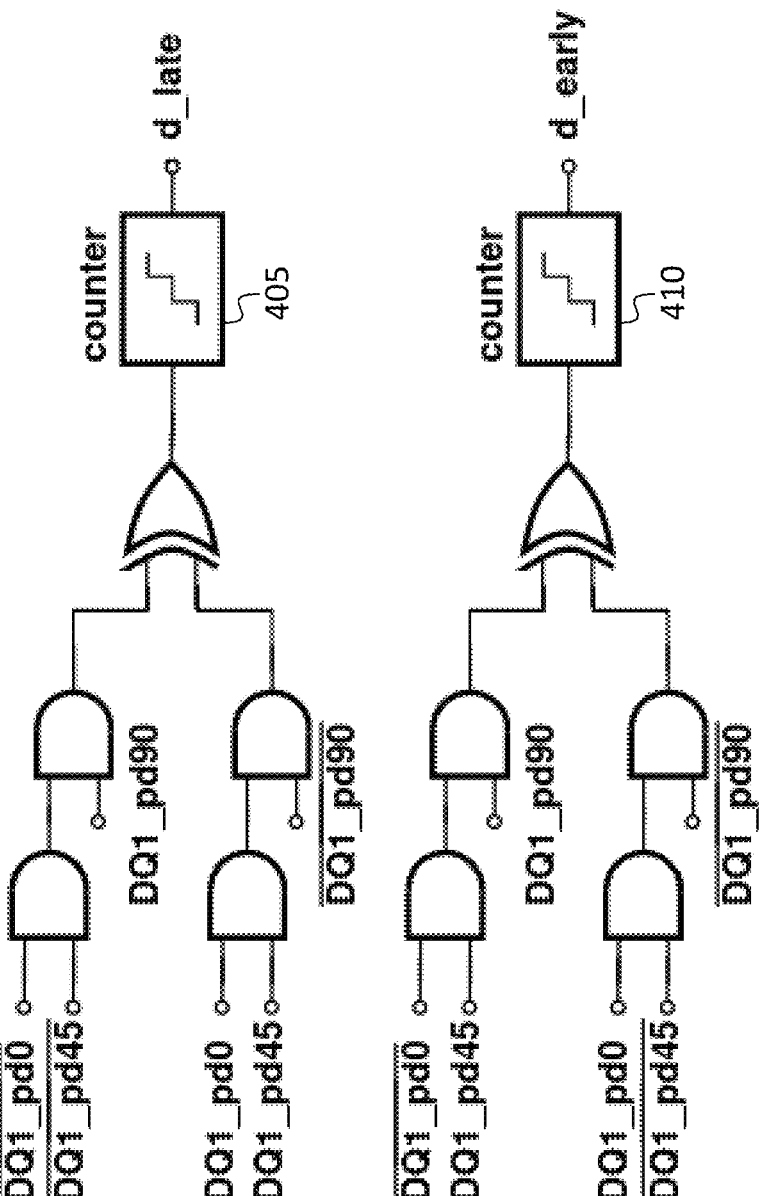
FIG. 4C is a schematic diagram of a portion of a memory input-output circuit for determining a phase-error increment, according to an embodiment of the present disclosure.
Figure 4D:
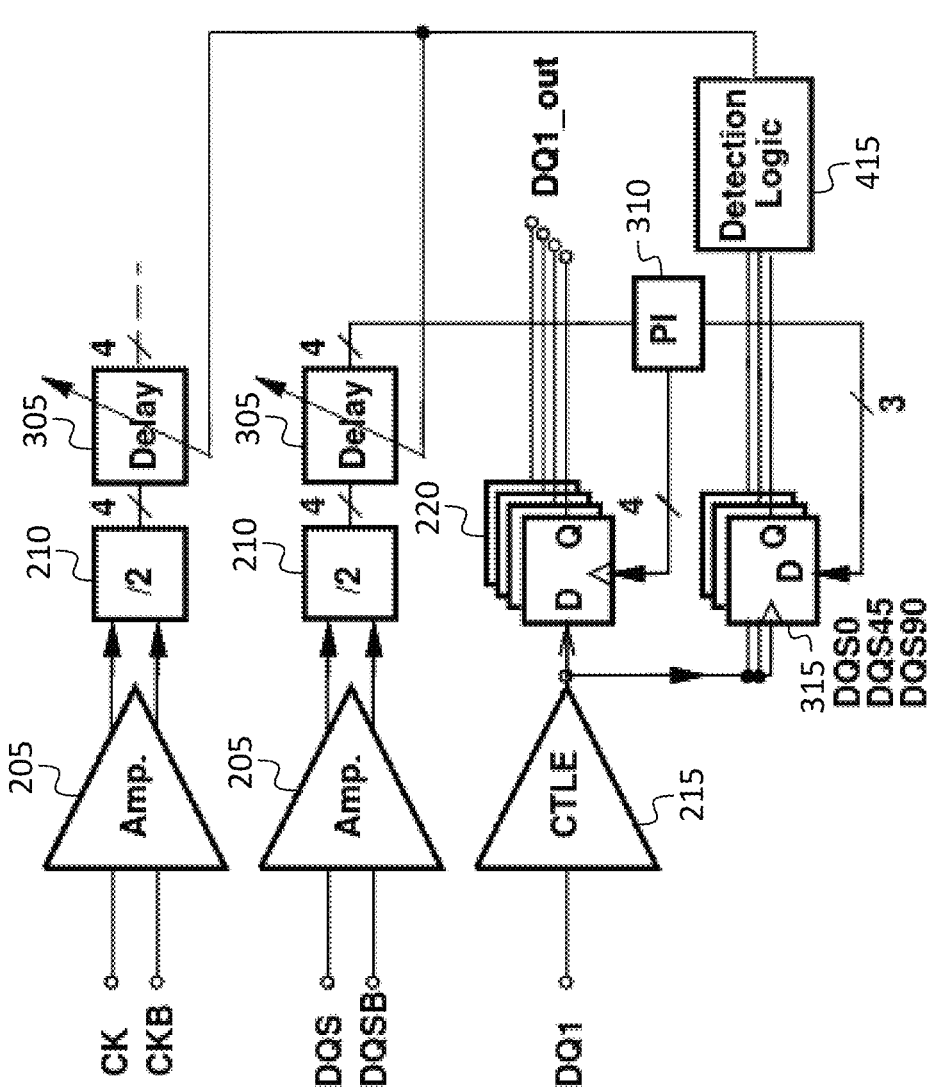
FIG. 4D is a schematic diagram of a portion of a memory input-output circuit with operating-mode phase adjustment of the second kind, showing feedback paths, according to an embodiment of the present disclosure.

Referring to FIGS. 4B, 4C, and 4D, the data strobe phase control circuit may then advance either a first counter (which may be referred as a late counter) or a second counter (which may be referred to as an early counter) according to whether the samples indicate that the edge in the interpolated signal is late or early (and the edges in the first data strobe signal and the second data strobe signal, are therefore late or early). Whether the edge in the interpolated signal, and the edges in the first data strobe signal and the second data strobe signal, are late or early may be determined based on the samples, and the phase of each of the data strobe signals may then be adjusted accordingly, by the data strobe phase control circuit.

The determining may be performed as follows. In a first circumstance, the data strobe phase control circuit may (i) determine that the sample of the first data strobe signal with the edge of the first data signal has a first value, (ii) determine that the sample of the interpolated signal with the edge of the first data signal has a second value, (iii) determine that the sample of the second data strobe signal with the edge of the first data signal has a third value, (iv) determine that the second value is different from the first value (for example, determine that DQS0≠DQS45) and (v) determine that the third value is the same as the second value (for example, determine that DQS45=DQS90). Based on these determinations, the data strobe phase control circuit may advance the first counter (the late counter).

In a second circumstance, the data strobe phase control circuit may (i) determine that the sample of the first data strobe signal with the edge of the first data signal has a first value, (ii) determine that the sample of the interpolated signal with the edge of the first data signal has a second value, (iii) determine that the sample of the second data strobe signal with the edge of the first data signal has a third value, (iv) determine that the second value is the same as the first value (for example, determine that DQS0=DQS45) and (v) determine that the third value is different from the second value (for example, determine that DQS45 #DQS90). Based on these determinations, the data strobe phase control circuit may advance the second counter (the early counter).

This approach may be effective to make an appropriate counter change (for example, to advance either the first counter or the second counter) at both time $t_1$ and time $t_3$ in FIG. 4B. If the three samples are all the same (as is the case at time $t_2$), then neither counter may be advanced. FIG. 4C shows a circuit that may be used to advance either the first counter 405 or the second counter 410 based on the samples. In some embodiments, OR gates may be used in place of the exclusive-OR gates shown, to similar effect. FIG. 4D shows a circuit similar to that of FIG. 4A, with phase error detection logic 415 (which may include, for example, the circuit of FIG. 4C) shown feeding a phase adjustment signal to the delay circuits 305 (which are, in FIG. 4D, explicitly shown to be adjustable). In some embodiments the circuits of FIGS. 4A, 4C, and 4D may be generalized (for example, by including an additional phase interpolator to generate a second interpolated signal that is 90 degrees out of phase with the interpolated signal, and by sampling on both the rising and falling edges of the data signal) to perform phase error measurements at additional points in time (e.g., at additional edges in the data signal).

Figure 5:
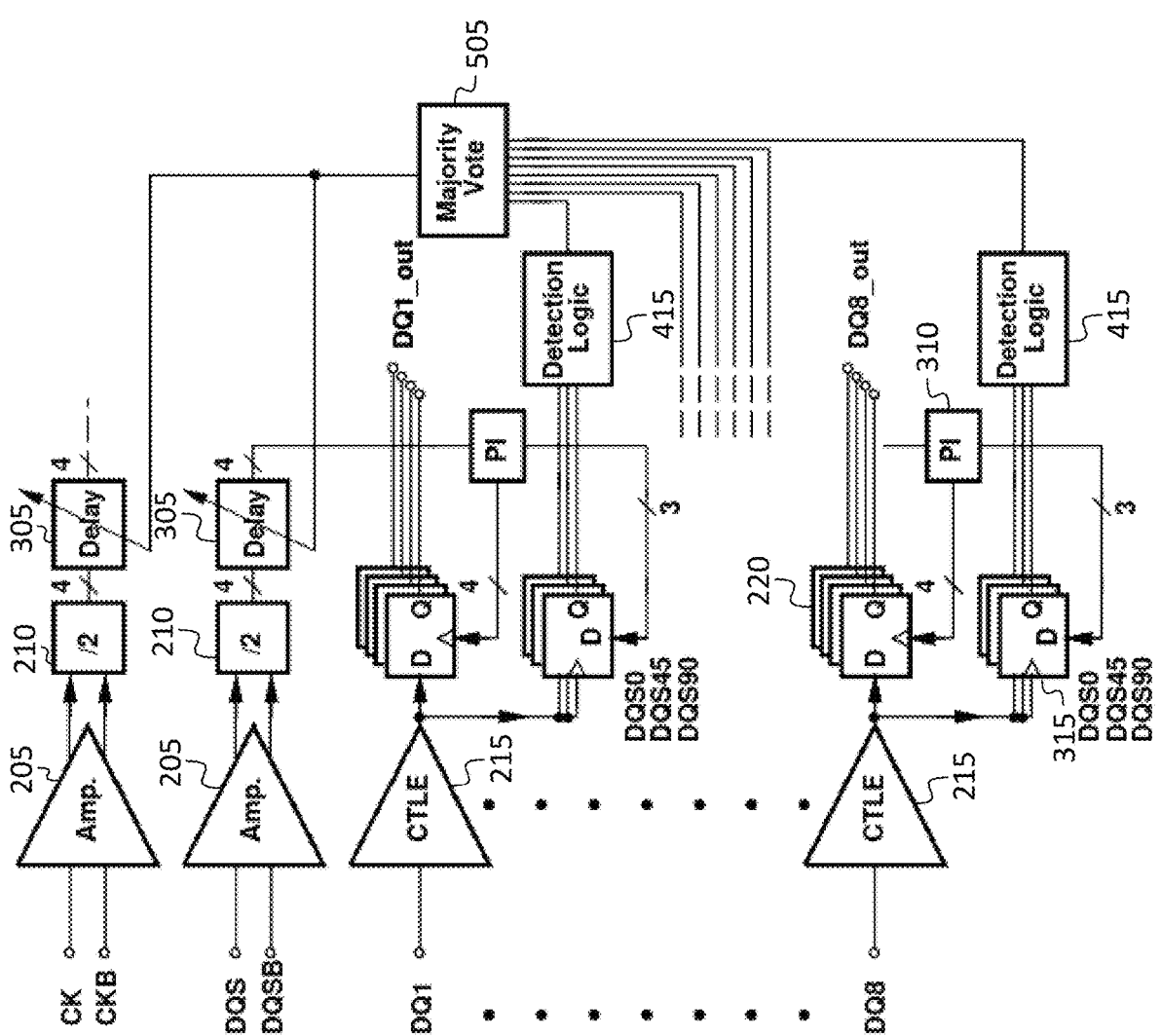
FIG. 5 is a schematic diagram of a portion of a memory input-output circuit with operating-mode phase adjustment of a third kind, according to an embodiment of the present disclosure.

To improve the signal to noise ratio of the phase error detection, the relative phase measurements performed at a plurality of bits (for example, 8 bits) may be combined, as illustrated in FIG. 5. A majority vote (regarding whether to advance or retard the phase of the data strobe signals) may be determined in a voting circuit 505, and the result may be used to adjust the phase of all of the delay circuits 305. For example, per write event, each of the eight data paths may count d_early and d_late, and after each write enable goes low, the delay code controlling the delay circuits 305 may be updated according to the majority determination of whether the phase should be advanced or retarded.

In some embodiments, the memory input-output circuit is fabricated on the same semiconductor chip as the memory for which it generates drive signals. Some embodiments make it possible for the memory input-output circuit to correct for process, power-supply voltage, and temperature (PVT) variations online (for example, in operating mode). Some embodiments may be used with any other standard in which a system uses a clock forwarding scheme, burst length is short, and the system is not configured to run clock and data recovery (CDR) continuously. Such a system has many parallel signal paths sharing one clock source, and the system may save power and run this calibration periodically to follow temperature and voltage variations. Some embodiments may be applied to Universal Chiplet Interconnect Express (UCIe), Graphics double data rate synchronous dynamic random-access memory (GDDR), low power double data rate memory (LPDDR), and high-bandwidth memory (HBM).

FIG. 6 is a flowchart of a method, in some embodiments. The method includes: performing, at 610, by a first phase control circuit of a memory input-output circuit, an operating-mode phase adjustment of a phase of a second data signal, wherein the memory input-output circuit includes: a first circuit for generating a first data signal; a second circuit for generating the second data signal; and the first phase control circuit. In some embodiments: the first phase control circuit includes a phase interpolator; and the method includes generating, by the phase interpolator, a first interpolated signal having a phase between the second data signal and a third data signal. In some embodiments: the first phase control circuit includes a phase interpolator; and the method includes generating, by the phase interpolator, a first interpolated signal having a phase between the second data signal and a third data signal; and the third data signal has a phase differing from a phase of the second data signal by substantially ninety degrees. In some embodiments, the first phase control circuit includes a phase interpolator configured to generate a first interpolated signal having a phase substantially mid-way between the second data signal and a third data signal. In some embodiments, a semiconductor chip includes the memory input-output circuit and a memory cell.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least $(1-Y/100)$ times the first number and the second number is at most $(1+Y/100)$ times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (for example, in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (for example, an adjustment) or a first quantity (for example, a first variable) is referred to as being "based on" a second quantity (for example, a second variable) it means that the second quantity is an input to the method or influences the first quantity, for example, the second quantity may be an input (for example, the only input, or one of several inputs) to a function that calculates the first quantity, or the first quantity may be equal to the second quantity, or the first quantity may be the same as (for example, stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (for example, rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., $(1-35/100)$ times 10) and the recited maximum value of 13.5 (i.e., $(1+35/100)$ times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Some embodiments may include features of the following numbered statements.

1. A system, comprising:
   a memory input-output circuit, comprising:
      a first circuit for generating a first data signal;
      a second circuit for generating a second data signal; and
      a first phase control circuit,
   the first phase control circuit being configured to perform a phase adjustment of a phase of the second data signal.

2. The system of statement 1, wherein the first phase control circuit comprises a phase interpolator configured to generate a first interpolated signal having a phase between the second data signal and a third data signal.

3. The system of statement 1 or statement 2, wherein:
   the first phase control circuit comprises a phase interpolator configured to generate a first interpolated signal having a phase between the second data signal and a third data signal; and
   the third data signal has a phase differing from a phase of the second data signal by substantially ninety degrees.

4. The system of any one of the preceding statements, wherein:
   the first phase control circuit comprises a phase interpolator configured to generate a first interpolated signal; and
   the first phase control circuit is configured to perform an operating-mode phase adjustment of a phase of the second data signal based on:
      a value of the second data signal at an edge of the first data signal,
      a value of the first interpolated signal at the edge of the first data signal, and
      a value of a third data signal at the edge of the first data signal.

5. The system of any one of the preceding statements, wherein:
   the first phase control circuit comprises a phase interpolator configured to generate a first interpolated signal having a phase substantially mid-way between the second data signal and a third data signal; and
   the first phase control circuit is configured to perform an operating-mode phase adjustment of a phase of the second data signal based on:
      a value of the second data signal at an edge of the first data signal,
      a value of the first interpolated signal at the edge of the first data signal, and a value of a third data signal at the edge of the first data signal.

6. The system of any one of the preceding statements, wherein:
   the first phase control circuit comprises a phase interpolator configured to generate a first interpolated signal having a phase substantially mid-way between the second data signal and a third data signal.

7. The system of any one of the preceding statements, wherein:
   the first phase control circuit comprises a phase interpolator configured to generate a first interpolated signal; and
   the first phase control circuit is configured:
      to determine that a value of the second data signal at an edge of the first data signal equals a first value;
      to determine that a value of the first interpolated signal at an edge of the first data signal equals a second value;
      to determine that a value of a third data signal at an edge of the first data signal equals a third value;
      to determine that the second value is the same as the first value;
      to determine that the third value is different from the second value; and
      to advance a second counter.

8. The system of any one of the preceding statements, further comprising a memory cell, on a same semiconductor chip as the memory input-output circuit.

9. A device, comprising:
   a semiconductor chip, comprising:
      a memory cell, and
      a memory input-output circuit.
   the memory input-output circuit comprising:
      a first circuit for generating a first data signal;
      a second circuit for generating a second data signal; and
      a first phase control circuit,
   the first phase control circuit being configured to perform an operating-mode phase adjustment of a phase of the second data signal.

10. The device of statement 9, wherein the first phase control circuit comprises a phase interpolator configured to generate a first interpolated signal having a phase between the second data signal and a third data signal.

11. The device of statement 9 or statement 10, wherein:
    the first phase control circuit comprises a phase interpolator configured to generate a first interpolated signal having a phase between the second data signal and a third data signal; and
    the third data signal has a phase differing from a phase of the second data signal by substantially ninety degrees.

12. The device of any one of statements 9 to 11, wherein:
    the first phase control circuit comprises a phase interpolator configured to generate a first interpolated signal having a phase between the second data signal and a third data signal; and
    the first phase control circuit is configured to perform an operating-mode phase adjustment of a phase of the second data signal based on:
       a value of the second data signal at an edge of the first data signal,
       a value of the first interpolated signal at the edge of the first data signal, and a value of the third data signal at the edge of the first data signal.

13. The device of any one of statements 9 to 12, wherein:
    the first phase control circuit comprises a phase interpolator configured to generate a first interpolated signal having a phase substantially mid-way between the second data signal and a third data signal; and
    the first phase control circuit is configured to perform an operating-mode phase adjustment of a phase of the second data signal based on:
       a value of the second data signal at an edge of the first data signal,
       a value of the first interpolated signal at the edge of the first data signal, and
       a value of the third data signal at the edge of the first data signal.

14. The device of any one of statements 9 to 13, wherein:
    the first phase control circuit comprises a phase interpolator configured to generate a first interpolated signal having a phase substantially mid-way between the second data signal and a third data signal.

15. The device of any one of statements 9 to 14, wherein:
    the first phase control circuit comprises a phase interpolator configured to generate a first interpolated signal; and
    the first phase control circuit is configured:
       to determine that a value of the second data signal at an edge of the first data signal equals a first value;
       to determine that a value of the first interpolated signal at an edge of the first data signal equals a second value;
       to determine that a value of a third data signal at an edge of the first data signal equals a third value;
       to determine that the second value is the same as the first value;
       to determine that the third value is different from the second value; and
       to advance a second counter.

16. A method, comprising:
    performing, by a first phase control circuit of a memory input-output circuit, an operating-mode phase adjustment of a phase of a second data signal,
    wherein the memory input-output circuit comprises:
       a first circuit for generating a first data signal;
       a second circuit for generating the second data signal; and
       the first phase control circuit.

17. The method of statement 16, wherein:
    the first phase control circuit comprises a phase interpolator; and
    the method comprises generating, by the phase interpolator, a first interpolated signal having a phase between the second data signal and a third data signal.

18. The method of statement 16 or statement 17, wherein:
    the first phase control circuit comprises a phase interpolator; and
    the method comprises generating, by the phase interpolator, a first interpolated signal having a phase between the second data signal and a third data signal; and
    the third data signal has a phase differing from a phase of the second data signal by substantially ninety degrees.

19. The method of any one of statements 16 to 18, wherein the first phase control circuit comprises a phase interpolator configured to generate a first interpolated signal having a phase substantially mid-way between the second data signal and a third data signal.

20. The method of any one of statements 16 to 19, wherein a semiconductor chip comprises the memory input-output circuit and a memory cell.

Although exemplary embodiments of a system and method for memory signal calibration have been specifically described and illustrated herein, many modifications and variations will be apparent to those skilled in the art. Accordingly, it is to be understood that a system and method for memory signal calibration constructed according to principles of this disclosure may be embodied other than as specifically described herein. The invention is also defined in the following claims, and equivalents thereof.

What is claimed is:

1. A system, comprising:
a memory input-output circuit, comprising:
    a first circuit for generating a first data signal;
    a second circuit for generating a second data signal; and
    a first phase control circuit,
the first phase control circuit being configured to perform a phase adjustment of a phase of the second data signal,
the phase adjustment being based on whether an edge in an interpolated signal leads or a lags an edge in the first data signal,
the interpolated signal having a phase between the second data signal and a third data signal.

2. The system of claim 1, wherein the first phase control circuit comprises a phase interpolator configured to generate the interpolated signal.

3. The system of claim 1, wherein:
the first phase control circuit comprises a phase interpolator configured to generate the interpolated signal; and
the third data signal has a phase differing from a phase of the second data signal by substantially ninety degrees.

4. The system of claim 1, wherein:
the first phase control circuit comprises a phase interpolator configured to generate the interpolated signal; and
the first phase control circuit is configured to perform an operating-mode phase adjustment of a phase of the second data signal based on:
    a value of the second data signal at an edge of the first data signal,
    a value of the interpolated signal at the edge of the first data signal, and
    a value of the third data signal at the edge of the first data signal.

5. The system of claim 1, wherein:
the first phase control circuit comprises a phase interpolator configured to generate the interpolated signal, the interpolated signal having a phase substantially mid-way between the second data signal and the third data signal; and
the first phase control circuit is configured to perform an operating-mode phase adjustment of a phase of the second data signal based on:
    a value of the second data signal at an edge of the first data signal,
    a value of the interpolated signal at the edge of the first data signal, and
    a value of the third data signal at the edge of the first data signal.

6. The system of claim 1, wherein:
the first phase control circuit comprises a phase interpolator configured to generate the interpolated signal, the interpolated signal having a phase substantially mid-way between the second data signal and the third data signal.

7. The system of claim 1, wherein:
the first phase control circuit comprises a phase interpolator configured to generate the interpolated signal; and
the first phase control circuit is configured:
    to determine that a value of the second data signal at an edge of the first data signal equals a first value;
    to determine that a value of the interpolated signal at an edge of the first data signal equals a second value;
    to determine that a value of the third data signal at an edge of the first data signal equals a third value;
    to determine that the second value is the same as the first value;
    to determine that the third value is different from the second value; and
    to advance a second counter.

8. The system of claim 1, further comprising a memory cell, on a same semiconductor chip as the memory input-output circuit.

9. A device, comprising:
a semiconductor chip, comprising:
    a memory cell, and
    a memory input-output circuit,
    the memory input-output circuit comprising:
        a first circuit for generating a first data signal;
        a second circuit for generating a second data signal; and
        a first phase control circuit,
    the first phase control circuit being configured to perform an operating-mode phase adjustment of a phase of the second data signal,
    the operating-mode phase adjustment being based on whether an edge in an interpolated signal leads or a lags an edge in the first data signal,
    the interpolated signal having a phase between the second data signal and a third data signal.

10. The device of claim 9, wherein the first phase control circuit comprises a phase interpolator configured to generate the interpolated signal.

11. The device of claim 9, wherein:
the first phase control circuit comprises a phase interpolator configured to generate the interpolated signal; and
the third data signal has a phase differing from a phase of the second data signal by substantially ninety degrees.

12. The device of claim 9, wherein:
the first phase control circuit comprises a phase interpolator configured to generate the interpolated signal; and
the first phase control circuit is configured to perform the operating-mode phase adjustment of a phase of the second data signal based on:
    a value of the second data signal at an edge of the first data signal,
    a value of the interpolated signal at the edge of the first data signal, and
    a value of the third data signal at the edge of the first data signal.

13. The device of claim 9, wherein:
the first phase control circuit comprises a phase interpolator configured to generate the interpolated signal, the interpolated signal having a phase substantially mid-way between the second data signal and the third data signal; and
the first phase control circuit is configured to perform the operating-mode phase adjustment of a phase of the second data signal based on:

a value of the second data signal at an edge of the first data signal, a value of the interpolated signal at the edge of the first data signal, and a value of the third data signal at the edge of the first data signal.

14. The device of claim 9, wherein:

the first phase control circuit comprises a phase interpolator configured to generate the interpolated signal, the interpolated signal having a phase substantially midway between the second data signal and the third data signal.

15. The device of claim 9, wherein:

the first phase control circuit comprises a phase interpolator configured to generate the interpolated signal; and the first phase control circuit is configured:

to determine that a value of the second data signal at an edge of the first data signal equals a first value;

to determine that a value of the interpolated signal at an edge of the first data signal equals a second value;

to determine that a value of the third data signal at an edge of the first data signal equals a third value;

to determine that the second value is the same as the first value;

to determine that the third value is different from the second value; and to advance a second counter.

16. A method, comprising:

performing, by a first phase control circuit of a memory input-output circuit, an operating-mode phase adjustment of a phase of a second data signal, wherein:

the memory input-output circuit comprises:

a first circuit for generating a first data signal;

a second circuit for generating the second data signal; and the first phase control circuit;

the operating-mode phase adjustment is based on whether an edge in an interpolated signal leads or a lags an edge in the first data signal; and the interpolated signal has a phase between the second data signal and a third data signal.

17. The method of claim 16, wherein:

the first phase control circuit comprises a phase interpolator; and the method comprises generating, by the phase interpolator, the interpolated signal.

18. The method of claim 16, wherein:

the first phase control circuit comprises a phase interpolator; and the method comprises generating, by the phase interpolator, the interpolated signal; and the third data signal has a phase differing from a phase of the second data signal by substantially ninety degrees.

19. The method of claim 16, wherein the first phase control circuit comprises a phase interpolator configured to generate the interpolated signal, the interpolated signal having a phase substantially mid-way between the second data signal and the third data signal.

20. The method of claim 16, wherein a semiconductor chip comprises the memory input-output circuit and a memory cell.

* * * * *